No. 12,433. REISSUED JAN. 2, 1906.

W. WOLFE.

HEEL BUILDING MACHINE.

APPLICATION FILED MAY 29, 1905.

2 SHEETS—SHEET 1.

Witnesses

Olivier B. Kaiser

Lee O'Donnell

Inventor

William Wolfe

By Wood & Wood. Attorneys

No. 12,433. REISSUED JAN. 2, 1906.

W. WOLFE.

HEEL BUILDING MACHINE.

APPLICATION FILED MAY 29, 1905.

2 SHEETS—SHEET 2.

Inventor

Witnesses

Oliver B. Kaiser

Leo O'Donnell

By William Wolfe

Woodworth.

Attorneys

UNITED STATES PATENT OFFICE.

WILLIAM WOLFE, OF BATAVIA, OHIO, ASSIGNOR TO THE AMERICAN HEEL MACHINE COMPANY, OF CINCINNATI, OHIO, A CORPORATION OF OHIO.

HEEL-BUILDING MACHINE.

No. 12,433. Specification of Reissued Letters Patent. Reissued Jan. 2, 1906.

Original No. 760,768, dated May 24, 1904. Application for reissue filed May 29, 1905. Serial No. 262,943.

*To all whom it may concern:*

Be it known that I, WILLIAM WOLFE, a citizen of the United States, residing at Batavia, in the county of Clermont and State of Ohio, have invented a new and useful Heel-Building Machine, of which the following is a specification.

This invention relates to improvements in machines of that class employed in the manufacture of heel-blanks, and has for its principal object to provide means for relatively adjusting a number of compiled taps or lifts to a suitable form of adjusting devices and then uniting the same in the form of a heel-blank by a fastening device. It is to be understood that the compiled lifts when adjusted into form and united constitute the heel-blank from which the finished heel is formed by a subsequent operation.

A further object of the invention is to provide novel mechanism of the single-actuating-movement type wherein the parts assume inoperative position immediately after each operative movement and remain in inoperative position until again connected to the actuating mechanism.

Another object of the invention is to provide a heel-lift carrier adapted to carry a pile of heel-lifts into position under a nail block and driver and into engagement with heel-lift-adjusting devices and to provide suitable actuating mechanism adapted to move the carrier with its load into position and to drive a nail through the compiled lifts.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 2:
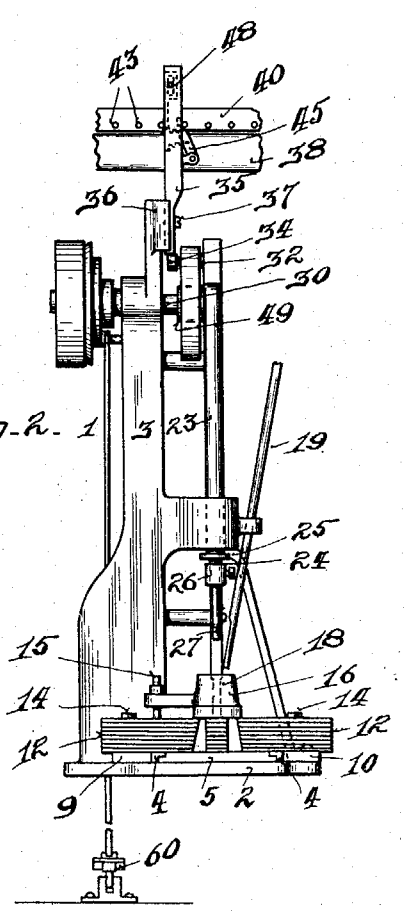
Figure 1:
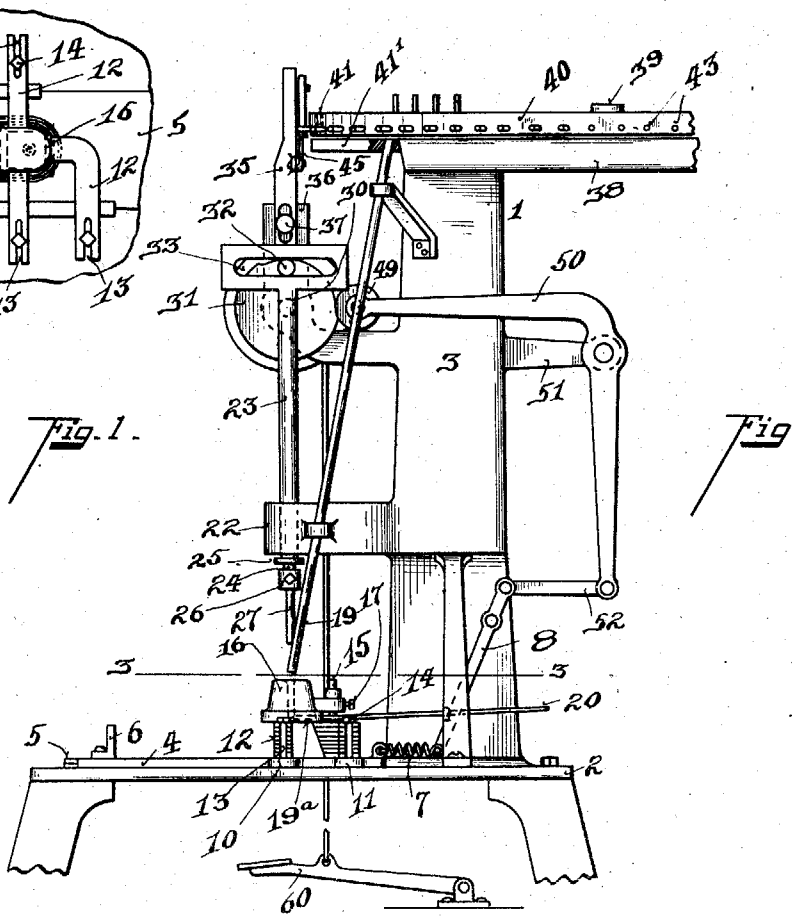
Figure 3:
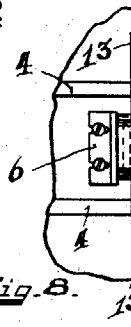
Figure 3:
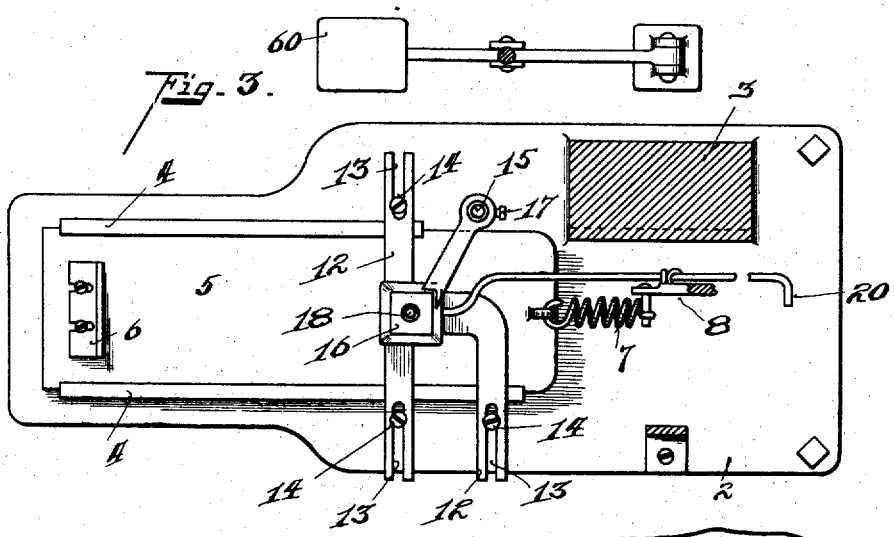
Figure 5:
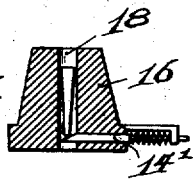
Figure 7:
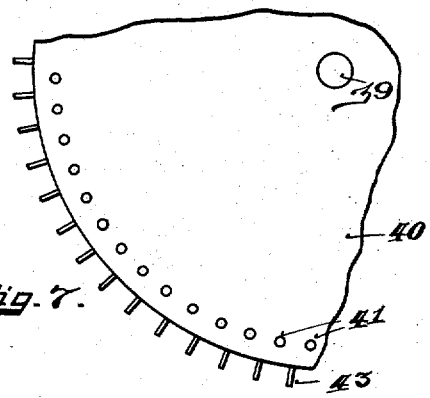
Figure 6:
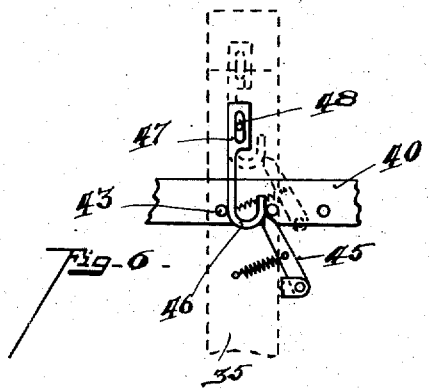
Figure 4:
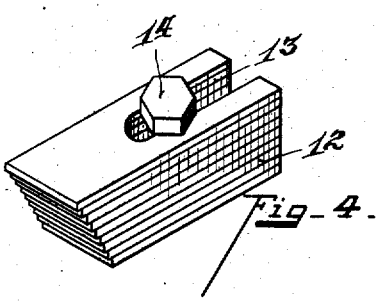

In the accompanying drawings, Figure 1 is a side elevation of the heel-building machine constructed in accordance with the invention. Fig. 2 is a front elevation of the same. Fig. 3 is a plan view, partly in section, on the line 3 3 of Fig. 1. Fig. 4 is a detail perspective view of one of the tap or lift adjusting blocks. Fig. 5 is a transverse sectional elevation of a slightly-modified construction of nail-block. Fig. 6 is a detail view of a portion of the mechanism for imparting intermittent rotative movement to the nail-feeding disk. Fig. 7 is a plan view of a portion of the nail-feeding disk. Fig. 8 is a plan view of a part of the machine, illustrating in full and dotted lines the relative position of carrier, gage, alining devices, and nail-block in nailing position.

Similar numerals of reference are employed to indicate corresponding parts throughout the several figures of the drawings.

The frame 1 of the machine is mounted on a suitable bed or table at a convenient height above the floor and includes a base member 2 and a vertical arm 3. The base is provided with a pair of horizontally-disposed guides 4 for the reception of a heel-lift carrier 5, by which the assembled taps or lifts are moved to position under the nail-driving mechanism, said carrier being provided near one end with a gage 6, against which the lifts are piled until they are level with the top of the gage. The carrier is connected by a helical spring 7 to a bell-crank lever 8, pivotally mounted on a stud at one side of the spindle 3 and receiving reciprocal motion in the manner hereinafter described. This spring serves to cushion the throw of the carrier and prevents such jar as would disengage the lifts.

At opposite sides of the base-plate are arranged blocks 9, 10, and 11. These blocks serve as supports for a plurality of plates 12, each of which is provided with a slot 13 for the passage of a locking-bolt 14, adapted to a threaded opening in the block, and said plates are preferably independent of each other, clamped in an adjustable position by means of the bolts. The position assumed by the plates is of course dependent on the shape of the heel to be made, and these plates are preferably each of a thickness about equal to that of one of the taps or lifts, so that each will engage its proper tap or lift and move the whole to a predetermined position with respect to the remaining portion of the heel. The plates carried by the blocks 9 and 10 extend in a direction transverse of the base and are arranged directly opposite each other and upon opposite sides of the carrier 5 in position to engage the side edges of the heel-lifts, while the plates carried by the block 11 are slightly curved in order that their operating faces or ends may engage the rear face of the heel at the inner end of the carrier, the mounting of these plates being such as not to interfere with free movement of the said carrier.

At one side of the base is a vertically-disposed rod 15, carrying a perforated nail-block 16, that may be adjusted to a position immediately above the several tap or lift engaging plates and locked in such position by means of a set-screw 17, and said block may be adjusted vertically in accordance with the height of the heels to be made. This block is provided with an approximately central opening 18, through which the nails are fed singly from the chute 19, the nails being held from falling through the opening by means of a small strip or plate 19ª, preferably arranged in a slot at the bottom of the block. This plate is rearwardly extended and has a terminal hook 20, connecting the bell-crank lever 8, so that when the lever is moved the carrier will be withdrawn from under the nail and the latter allowed to fall into contact with the heel-blank.

The frame of the machine is provided with an upwardly-projected arm 22, in which is formed a guiding-opening for the reception of a vertically-movable bar 23. The lower end of this bar is threaded for the reception of a screw 24, that is provided with a milled collar 25, that may be turned in order to adjust the position of the screw, and to the lower end of the screw is secured a chuck 26, carrying a driver-rod 27, which is reciprocated in order to drive the nails through the nail-block to the heel-blank.

The frame of the machine is provided with bearings for the reception of a main actuating-shaft 30, to the inner end of which is secured a combined cam and crank disk 31, having a wrist-pin 32, that extends through a horizontally-disposed slot 33 in a cross-head carried by or forming a part of the bar 23, the length of the slot being at least equal to the throw of the crank-pin. This mechanism serves to impart driving movement to the driver-rod.

On that side of the crank-disk opposite the wrist-pin is a lug or roller 34, that is adapted to make contact with the vertically-movable cam-bar 35, guided in a cross-bar 36 at the top of the frame, the bar being held in position by a headed pin or screw extending through a vertical slot in said bar.

At the top of the frame is a rearwardly-extending arm 38, carrying a vertical stud 39, that forms the center of rotation of a nail-feeding disk 40. This disk is provided with an annular series of nail-receiving pockets 41, to which nails are successively supplied in any suitable manner, and these pockets are successively brought into vertical alinement with the upper end of the nail-chute 19, so that single nails may fall through the chute to the opening 18 of the nail-block, preliminary discharge of the nails being prevented by contact with the arm or a suitable guard 41′, on which the nails rest up to the time the chute is reached. The disk is provided with a number of cam-teeth 43, corresponding to the number of pockets, and with these teeth engages the cam-bar 35, the bar being moved upward once at each operation of the machine and serving to impart angular movement to the disk to the extent of a single tooth.

At the upper end of the cam-bar 35 is a cam 45, that serves to engage the cam-teeth 43 at each upward movement of the cam-bar, and at each operation an angular movement is imparted to the disk to an extent equal to the distance between two of the cam-teeth, so that the nail-receiving pockets are successively presented in alinement with the nail-chute. The limit of effective movement of this cam is fixed by a guard 46, arranged at the upper end of the cam-bar, and in operation the upward movement of the cam-bar serves to impart to the disk a movement sufficient to feed a single nail to the chute at each operation. The guard member is provided with a slot 47, through which extends a locking-screw 48 for locking the guard in any position to which it may be adjusted.

The combined crank and cam disk has an irregular periphery, with which engages a roller 49, arranged at the inner end of a bell-crank lever 50, that is pivoted to an arm or bracket 51, extending rearwardly from the standard 3. The opposite arm of the bell-crank lever is connected by a link 52 to the lever 8, and the two levers are so proportioned that when operated upon by the cam-surface of the disk movement will be imparted to the carrier 5 and force the same in the direction of the heel-shaping plates 12, the connecting-spring between the lever 8 and the carrier being such as to yieldably hold the rear edges of the heel-forming taps or lifts against the rear adjusting-plates, and thus properly position the several lifts, while at the proper time the plate 14 will be withdrawn and allow the entering end of the nail to rest against the uppermost tap or lift in position to be driven home by the rod 24. This operation of the mechanism may be somewhat modified, as shown in Fig. 5, wherein the nail-block slide 14′ is shown in the form of a rod or plate having a tapering end portion against which the pointed end of the nail rests, the relation between the rod or plate and the nail being such that when downward movement is imparted to the nail by the driver-rod the nail will be forced past the plate and into the heel-blank.

On the shaft 30 is arranged a clutch, which may be of any ordinary construction, the clutch-operating mechanism being connected to a suitable pedal-lever 60 and being preferably arranged in such manner that a single movement of the pedal-lever will impart a single rotative movement to the shaft.

In the operation of the mechanism the heel-lifts are suitably compiled upon the carrier 5 to a height determined by the gage 6, and on the connection of the shaft to the actuating mechanism the carrier is drawn inward or in the direction of the nailing mechanism until the lifts engage the adjusting-plates and are moved to the proper relative position in which they are to be united. The slide 19[a] is then withdrawn, allowing a previously-fed nail to descend until its entering end rests on the uppermost lift. The driving-rod is now forced down until the nail has been driven through the lifts, and the heel-blank is formed and ready for subsequent treatment.

The nail-driving mechanism may be variously modified or the nails may be fed by hand to the nailing-block. Various other forms of eccentric-pin and cam devices may be employed in connection with the driving-shaft to alternately reciprocate the heel-lift carrier and the nail-driver in relative time movements.

The combination of elements forming the vital feature of the invention is shown in Fig. 8 in position for nailing, in which the heel-lifts rest upon the carrier directly under the nail-block, the edges of the heel-lifts being engaged by their adjusting devices consisting of the gage 6 and the plates 12, there being of course suitable actuating devices to impart to the nail-driver and the heel-lift carrier the relative time movements already described.

Preferably, though not essentially, the plates 12 are relatively adjustable laterally on the bed and are readily detachable, so as to be easily built up or down for different sizes and shapes of heel-blanks; but whether the plates are separable or integral their main function is to automatically engage the heel-lifts when they are presented by the carrier and to relatively adjust them or shift their position on the slide to correspond with the desired form of heel-blank and in proper position relative to the nail-block for the nailing operation.

This device constitutes a very rapid and effective heel-blank-forming machine in which the manual operation is reduced to a minimum.

While no means are shown for automatically returning the carrier 5 to initial position, it is obvious that it could be returned by hand, or devices of common knowledge in the mechanical art could be readily supplied for maintaining the roller 49 in contact with its controlling-disk or other devices could be supplied for automatically returning the carrier to initial position.

Having described my invention, I claim—

1. In a heel-building machine, a plurality of sectional and independently-adjustable plates for engagement with the edges of heel-lifts, and a carrier for receiving and moving the heel-lifts into engagement with said adjusting-plates, substantially as described.

2. In a heel-building machine, a plurality of independently-adjustable plates adapted to adjust a pile of heel-lifts, a carrier for supporting the lifts, and a gage carried by the carrier and serving in connection with the latter to force the lifts into engagement with the plates, substantially as described.

3. In a heel-building machine, a plurality of independently-adjustable plates adapted to adjust a pile of heel-lifts, a carrier for the compilation of heel-lifts, a gage on the carrier serving in connection with the plates to engage the heel-lifts and form the heel-blank, means for reciprocating the carrier, and means for cushioning said movement, substantially as described.

4. In a heel-building machine, a bed-plate having guides, a carrier engaging said guides, a pair of sectional and independently-adjustable heel-lift-adjusting devices carried by the bed-plate and extending over the carrier, a third heel-lift-adjusting device carried by the bed-plate and held in position for engagement by the rear edge of the heel-blank, and means for moving the carrier to move the taps or lifts into engagement with the said adjusting devices, substantially as described.

5. In a machine of the class described, a bed adjusting devices on the bed, a perforated nailing-block for engaging over the top of the blanks, means for feeding nails to the perforations, a nail-driver, an actuating-shaft, connections between the shaft and driver, a blank-supporting carrier, and connections between said driving-shaft and carrier for moving the latter into position for the nail-driving operation, substantially as described.

6. In a heel-building machine, a bed, heel-lift-adjusting devices on said bed, a heel-blank, carrier, a preforated nail-block carrier, a nail-driver, a driving-shaft, connections between the said shaft and the nail-driver, connections between the said shaft and the carrier adapted to actuate said members in time movements, and means for intermittingly operating the said shaft, substantially as described.

7. In a heel-building machine, a bed having a slideway, a heel-lift carrier adapted to be reciprocated in said slideway, devices for adjusting the edges of the heel-lifts located on the bed at the inner end of the slideway, a device on the carrier for adjusting the edges of the heel-lifts, and a nailing mechanism supported upon the bed over the inner end of said slideway.

8. In a heel-building machine, a bed having a slideway, a heel-lift carrier adapted to be reciprocated in said slideway, adjusting devices on the bed at the inner end of the slideway, adapted to engage the curved edges of the lifts when presented by the carrier, a device on the carrier for adjusting the straight edges of the lifts, and a nailing mechanism supported on the bed over the inner end of said slideway and between the stationary adjusting devices.

9. In a heel-building machine, a bed having a slideway, a heel-lift carrier adapted to be reciprocated in said slideway, devices for adjusting the edges of the heel-lifts located on the bed at the inner end of the slideway, a coöperating device on the carrier for adjusting the edges of the heel-lifts, a nailing mechanism supported upon the bed over the inner end of said slideway, and power-driven means for automatically actuating the driving mechanism and the sliding carrier, substanially as described.

10. In a machine of the class described, a bed, a nail-block over the bed, a carrier on the bed movable to and from position under the nail-block, devices located on the carrier and on the bed for engaging and adjusting the heel-lifts on the carrier, and power-driven means for driving a nail from the nail-block through the heel-lifts, and for moving the carrier into position for the nail-driving operation, substantially as described.

11. In a machine of the class described, a bed, a nail-block over the bed, a carrier on the bed movable to and from position under the nail-block, a gage on the carrier for engaging the front edges of the heel-lifts, adjusting devices on the bed around the carrier for engaging the rear and side edges of the heel-lifts, and power-driven means for driving a nail from the nail-block through the lifts and for moving the carrier into position for the nail driving operation, substantially as described.

12. In a heel-buiding machine, a bed, a carrier for supporting the heel-lifts, a nail block and driver for engaging the top of the lifts, adjusting and gage devices for engaging the edges of the lifts, driving mechanism and connections adapted to move the carrier to bring the compiled lifts into engagement with the adjusting devices under the nailing-block and to operate the driver, substantially as described.

13. In a heel-building machine, a bed, a carrier for supporting the heel-lifts, a nail block and driver for engaging the top of the lifts, adjusting and gage devices for engaging the edges of the lifts, a driving-shaft, connections between said driving-shaft, the nail driver and carrier adapted to move the carrier on the bed to engage the lifts with the adjusting devices under the nail-block, to drive a nail, and means for intermittingly operating said shaft, substantially as described.

In testimony whereof I have signed my name to this specification in the presence of two subscribing witnesses.

WILLIAM WOLFE.

Witnesses:

CHARLES W. LOVETT,
E. M. SMERLING.